United States Patent [19]
Fox

[11] 3,735,133
[45] May 22, 1973

[54] REAR SCREEN PROJECTION DEVICE PROVIDED WITH LUMINOUS MARKINGS

[75] Inventor: James E. Fox, Northport, N.Y.
[73] Assignee: Diamagnetics, Inc., Freeport, N.Y.
[22] Filed: July 7, 1971
[21] Appl. No.: 160,365

[52] U.S. Cl. .................................................. 250/72
[51] Int. Cl. .................................................. G01d 7/06
[58] Field of Search ........................... 250/71 R, 72

[56] References Cited
UNITED STATES PATENTS
3,488,498   1/1970   Glowa et al. ..................... 250/72

Primary Examiner—James W. Lawrence
Assistant Examiner—Davis L. Willis
Attorney—David S. Kane, Daniel H. Kane, Philip T. Dalsimer et al.

[57] ABSTRACT

An improved rear screen projection device is disclosed. The projection device includes a front mounted source of non-visible light directed at indicia or reference markings on the screen. The markings are formed from a luminous paint or ink which glows under the nonvisible light thereby enabling the visibility of the markings to be vastly improved without effecting the resolution of the projected image. The ink is transparent or translucent so as not to interfere with any portion of the projected image.

3 Claims, 2 Drawing Figures

PATENTED MAY 22 1973 3,735,133

INVENTOR.
JAMES E. FOX
BY
Kane, Dalsimer, Kane, Sullivan Kurucz
ATTORNEYS

REAR SCREEN PROJECTION DEVICE PROVIDED WITH LUMINOUS MARKINGS

BACKGROUND OF THE INVENTION

Rear screen projection devices find application in many areas of industry, commerce, and education. Examples of such devices include still and moving picture projectors, microfilm readers, comparators, and shadow graphs to name just a few. These devices all have in common the fact that an immage is projected onto the rear of a transparent or translucent screen for viewing from the front.

It is often necessary for the viewer of the rear screen projector to compare the viewed image to some fixed markings on the screen. The markings may be simple, such as a set of cross hairs, measuring scale, or the like or they comprise a complex pattern which the contours of the viewed image are to follow. In either case, it is desirable for both the markings and image to have maximum fidelity and resolution. This is not possible with conventional rear screen projection devices since the rear screen lighting which is necessary for the projected image detracts from the fixed markings while any front lighting of the screen would adversely effect the resolution of the projected image. Also, it is undesirable for the markings to interfere with the outline of the projected image by blocking out a portion of the same. This is particularly important where the dimensions of the viewed image are critical.

Heretofore, it has been suggested to improve the visibility of the markings by forming them of a luminescent material, as for example, in U. S. Pat. No. 3,488,498. However, since such prior art devices rely upon ambient ultraviolet light to excite the luminescent material, they have only met with partial success.

SUMMARY OF THE INVENTION

In view of the above, it is the primary object of the present invention to provide an improved rear screen projection device having a screen with fixed markings thereon independent of the projected image with means for improving the visibility of the markings without detracting from the resolution of the projected image or interfering with any portion of the image.

A further object of the present invention is to provide such means which may readily be adapted to presently existing rear screen projection devices at a minimum of cost and expense.

A still further object of the present invention is to provide a method for improving the visibility of fixed markings on the screen of a rear projection device without detracting from the resolution of the projected image.

The above and other beneficial objects and advantages are attained in accordance with the present invention by providing an improved projection device of the type adapted to project an image on the rear surface of a screen for viewing from in front of the screen with reference markings on the front surface of the screen formed of a luminescent material such as an ink or paint. The invention further includes a nonvisible light source mounted with respect to the device so that at least some of the nonvisible light rays are directed at the markings causing the same to glow. This will materially improve the visibility of the markings without at all detracting from the resolution of the projected image since the nonvisible light will not effect the projected, visible image. By forming the markings with a transparent or translucent ink, paint, or dye, the reference marks will not interfere with the projected image.

DETAILED DESCRIPTION OF THE PREFERRED EMBODIMENT

Figure 1:
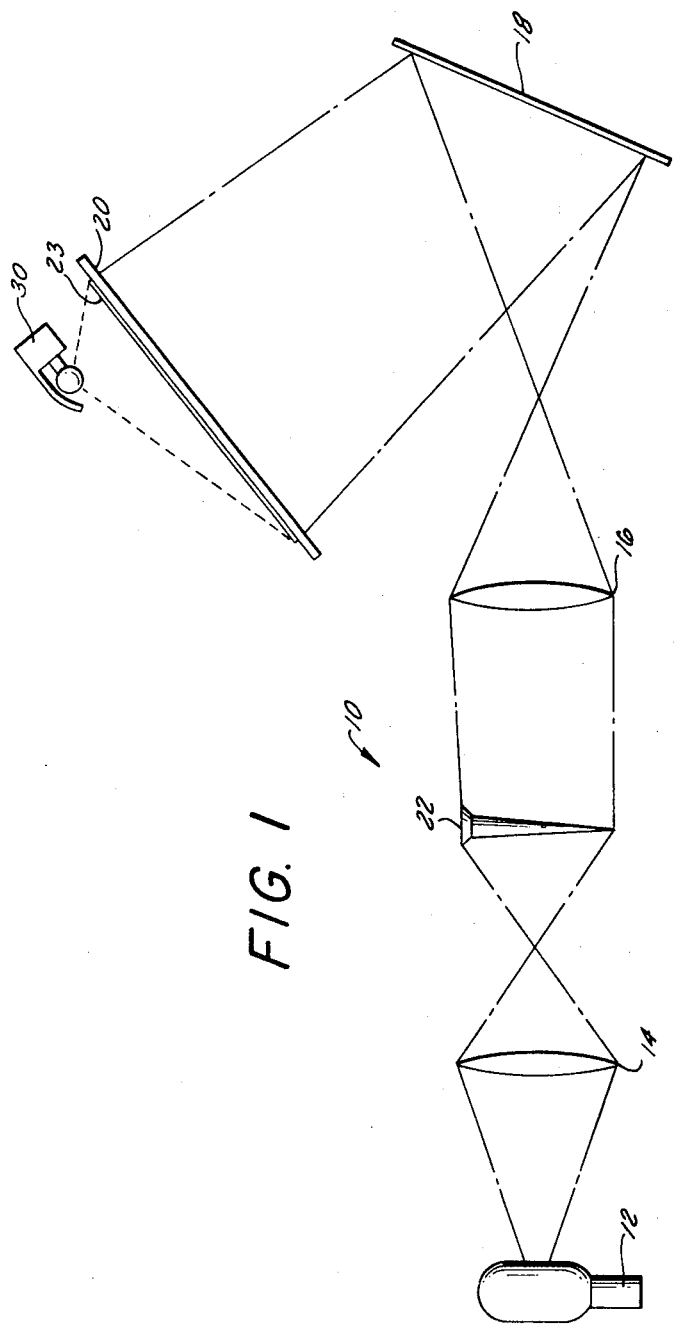
FIG. 1 is a schematic representation of a rear screen projection device in accordance with the present invention.

Reference is now made to the drawings and in particular to FIG. 1 wherein a typical rear screen projection device, a shadow graph, in accordance with the present invention is schematically shown. The shadow graph 10 comprises essentially a bulb 12, a set of lenses 14 and 16, a mirror 18, and a screen 20. The components are contained in a suitable light tight housing which includes a platform or the like to receive and position an object 22 between the lenses as shown. The components are further arranged so that when object 22 is suitably placed between the lenses, the shadow of the object is projected onto the rear of screen 20. By properly designing screen 20 in any one of many ways that are well known in the art, such as by frosting screen 20, the shadow may be viewed from the front of the device. Further, by properly designing and positioning the lenses with respect to the object and mirror, a magnified image may be obtained.

Figure 2:
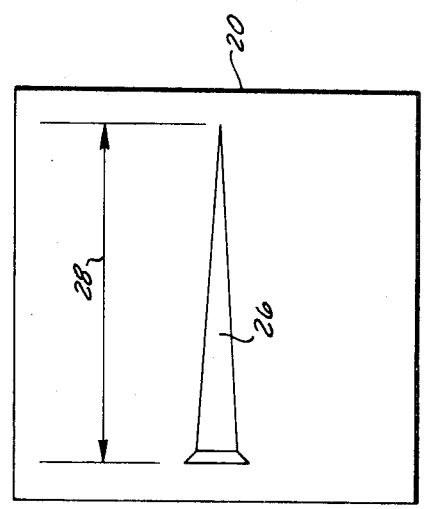
FIG. 2 is a representative plan view of the screen of the device.

Shadow graphs of the type described above are widely used in industry as comparators for use in comparing object 22 to some fixed reference. As an example, the shadow graph may be used to check the pitch on a thread screw or gear tooth. To this end, a transparent overlay 23 with the desired reference characteristics is provided over the front surface of screen 20. Printed on the overlay are the referencing markings to which the object is to be compared. FIG. 2 is a very simplified front view of a typical comparator application wherein the image 26 of object 22 is being compared to reference marks 28 on overlay 23, in this case to check the length of the object.

Because image 26 is projected from the rear of the overlay, it should be apparent that any direct visible lighting directed at the overlay to improve the clarity of the reference markings 28 would adversely effect the resolution of the projected image. Further, it should be apparent that if the reference line directly overlies the image, a portion of the image will be occluded if the reference line is formed of an opaque material as is the usual custom.

For these reasons, in accordance with the present invention, the markings 28 are formed with a transparent or translucent luminescent paint or ink. Such paints are commercially available from a large number of manufacturers and are produced in a wide range of colors. A variety of such inks and paints are marketed under the trademark DAY-GLO. These inks are clearly visible in ordinary light and also have the capability of glowing under the influence of light rays including both visible and nonvisible light such as ultraviolet or blacklight. In addition, the transparent inks allow the entire image to be seen through the ink. This feature is especially useful where the overlay or template 23 is not fixed and must be positioned with reference to a particular portion of the projected image.

The present invention also contemplates the provision of a source 30 of nonvisible light directed at the front of the screen so as to cause the markings to glow independently of the rear screen projecting light. This glowing enhances the visibility of the markings without at all detracting from the resolution of image 26.

Although it is desirable to protect the shadow graph screen with overlay 23, this is not absolutely necessary and, the markings 28 may be applied directly to the screen. However, in practice, such overlays are usually used so as to enable the same shadow graph to be used for a wider range of purposes and also to protect the front of the screen. The overlay is formed of a transparent plastic and a convenient way of applying the markings is to first inscribe the desired pattern on the overlay and then go over the inscribed lines with the ink or paint, removing any excess material which flows over the scribe marks. This method enables the reference marks to be readily replaced should they wear away through use. A diamond tipped stylus may be used for inscribing the template.

The preceding description of the preferred embodiment of the present invention has been directed specifically at a shadow graph type comparator. It is to be understood, however, that the present invention is by no means limited to such a device and, in fact, is intended to encompass all rear screen projection devices. In its broadest aspect, the present invention may be applied to all rear screen projection devices including various electronic instruments utilizing cathode ray tubes and the present patent application is intended to cover all such usages which fall within the appended claims.

Having thus described the invention, what is claimed is:

1. In a projection device of the type adapted to project an image on the rear surface of a screen for viewing from in front of the screen, the improvement comprising at least one marking on the front surface of the screen, said marking being formed of a luminescent material transparent to said image whereby to enable said image to be viewed from in front of said device, and means for producing nonvisible light mounted with respect to said device whereby at least some of the rays from said means are adapted to impinge upon said marking causing the same to glow.

2. The invention in accordance with claim 1 wherein said light source comprises an ultraviolet light source.

3. The invention in accordance with claim 1 further comprising a transparent template overlaying the front surface of said screen and said markings are disposed on said template.

* * * * *